(12) United States Patent
Rone et al.

(10) Patent No.: US 8,488,758 B1
(45) Date of Patent: Jul. 16, 2013

(54) METHOD AND SYSTEM FOR DOCUMENTING INTERACTIONS WITH PROFESSIONAL SERVICE PROVIDERS

(76) Inventors: Bryan Rone, Lexington, KY (US); Sidney VanNess, Lexington, KY (US)

(*) Notice: Subject to any disclaimer, the term of this patent is extended or adjusted under 35 U.S.C. 154(b) by 1053 days.

(21) Appl. No.: 12/409,124

(22) Filed: Mar. 23, 2009

Related U.S. Application Data

(60) Provisional application No. 61/039,507, filed on Mar. 26, 2008.

(51) Int. Cl.
*H04M 15/00* (2006.01)

(52) U.S. Cl.
USPC ............ 379/114.03; 379/114.05; 379/114.06; 379/114.1; 379/88.22

(58) Field of Classification Search
USPC ............................................ 379/88.13–88.15
See application file for complete search history.

(56) References Cited

U.S. PATENT DOCUMENTS

| | | | |
|---|---|---|---|
| 5,825,854 A * | 10/1998 | Larson et al. | 379/88.14 |
| 7,289,608 B2 | 10/2007 | Kumhyr | |
| 7,492,883 B2 | 2/2009 | Kumhyr | |
| 2004/0165713 A1 * | 8/2004 | Leighton | 379/225 |
| 2005/0147215 A1 | 7/2005 | Kumhyr | |
| 2005/0147216 A1 | 7/2005 | Janakiraman et al. | |
| 2005/0152522 A1 | 7/2005 | Kumhyr | |
| 2007/0189496 A1 * | 8/2007 | Kahn | 379/350 |
| 2007/0201666 A1 | 8/2007 | Kumhyr | |
| 2009/0172027 A1 * | 7/2009 | Bhogal et al. | 707/104.1 |

* cited by examiner

*Primary Examiner* — Duc Nguyen
*Assistant Examiner* — Ibraham Sharifzada

(57) ABSTRACT

The present invention is a graphical interface for predetermining the means by which incoming telephone calls are directed. Buttons on a telephone keypad are assigned to particular professionals who determine the method by which they wish to receive the incoming call. The incoming calls can be tagged to be automatically billed, recorded, or both.

24 Claims, 1 Drawing Sheet

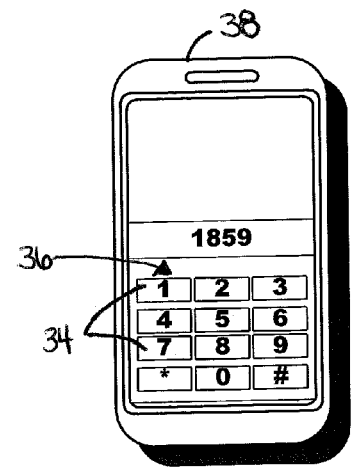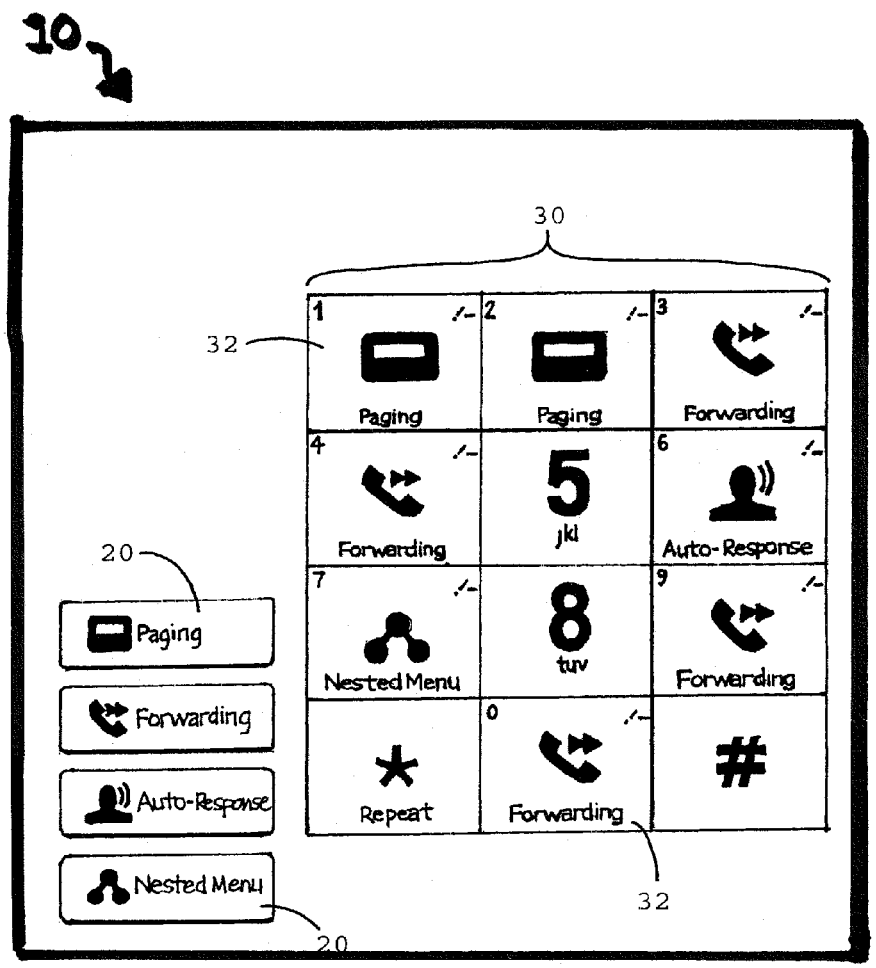

METHOD AND SYSTEM FOR DOCUMENTING INTERACTIONS WITH PROFESSIONAL SERVICE PROVIDERS

CROSS-REFERENCE TO RELATED APPLICATION

The present invention claims priority to provisional U.S. Patent Application No. 61/039,507 as filed Mar. 26, 2008.

STATEMENT REGARDING FEDERALLY SPONSORED RESEARCH

Not applicable.

NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND ON THE INVENTION

1. Field of the Invention

The present invention relates generally to telecommunications, and more particularly, relates to a method and system for documenting communications between a professional service provider and a client.

2. Description of the Related Art

The primary means by which most professional service providers interact with clients and potential clients is by telephone, whether as a wired "land line" or a wireless mobile device. Although the vast majority of communications between professional service providers and individuals is conducted by telephone, professional service providers tend to lose valuable billing time and fail to take adequate and detailed notes on such communications. As such, the professional service providers lose money and tend to be less organized than they otherwise could be.

Furthermore, many professional service providers have personal preferences on how they are contacted. For example, some professional service providers prefer to be contacted directly by clients and potential clients. Other professional service providers prefer to receive a voicemail or email from an individual so the professional service provider may consider the question presented prior to speaking with the individual.

Thus, what is desired is a means of better capturing the billable time and information regarding communications with professional service providers, while also allowing for a more flexible means of how the professional service provider is contacted.

SUMMARY

The various exemplary embodiments of the present invention include a computer software implemented method for creation and manipulation of a graphical interface for directing incoming telephone communications from a client to a professional service provider. The method is comprised of the steps of associating one or more telephone numbers of a telephone system with the computer software; assigning at least one functional module to one or more buttons of a telephone keypad via the graphical interface, wherein the one or more buttons of a telephone keypad are associated with identical buttons on a telephone keypad of an individual calling into the telephone system; and directing the incoming telephone communication based on the assignment of the at least one functional module.

The various exemplary embodiments further include a software-based graphical interface for directing incoming telephone communications. The graphical interface is comprised of at least one functional module, one or more buttons of a telephone keypad associated with identical buttons on a telephone keypad of an individual calling into the telephone system, a manipulating means for assigning at least one functional module with the one or more buttons of the telephone keypad, and an associating means for storing assignment of the at least one functional module with the one or more buttons of the telephone keypad in a telephone system such that incoming telephone communications may be directed as assigned.

BRIEF DESCRIPTION OF THE DRAWINGS

The various exemplary embodiments of the present invention, which will become more apparent as the description proceeds, are described in the following detailed description in conjunction with the accompanying drawings, in which:

FIG. 1 is an illustrated example of a graphical interface associated with the method and system of the present invention.

DESCRIPTION OF THE REFERENCED NUMERALS

In reference to the drawings, similar reference characters denote similar elements throughout all the drawings. The following is a list of the reference characters and associated element:

10 Graphical interface
20 Functional module
30 Telephone keypad
32 Button
34 Button
36 Keypad
38 Telephone

DETAILED DESCRIPTION

Exemplary embodiments of the present invention relate to a computer software implemented method for creation and manipulation of a graphical interface for directing incoming telephone communications.

The present invention allows for an individual to contact his respective professional service provider such that a substantially permanent record of the interaction between the individual and his professional service provider is created. The method further provides for a means of automated billing, recording, transcription, and synchronization with other software by making call data securely available via an application programming interface.

A professional service provider may be, for example, a doctor, nurse, lawyer, paralegal, accountant, manager, or any other service provider who may choose to bill for time spent on the phone with clients, etc.

As set forth above, a primary means by which many individuals communicate with their respective professional service provider is via a telephone or other similar audio communication means. Typically, the professional service provider has a need and mandate to document every such transaction with individuals. The present invention provides automated documentation in the form of time stamps, call recordings, call durations, and the option to record summary dictations at the conclusion of a voicemail or live phone call.

In the various exemplary embodiments of the present invention, there exists a computer software implemented method for creation and manipulation of a graphical interface for directing incoming telephone communications.

The computer software according the exemplary embodiments may be accessed via one or more computers, servers, Internet-based applications, Internet-accessible applications, mobile computers, and the like.

The method begins with associating one or more telephone numbers of a telephone system with the computer software by way of the graphical interface 10. An example of such interface is illustrated, for example, in FIG. 1.

By way of the graphical interface 10, at least one functional module 20 is assigned to one or more buttons 32 of a telephone keypad 30. The one or more buttons 32 of the telephone keypad 30 are directly associated with identical buttons 34 on an actual telephone keypad 36 of a telephone 38 of an individual calling into the telephone system. In the exemplary embodiment of FIG. 1, a functional module 20 may be dragged to a particular button 32 to assign the functional module to the button.

The at least one functional module may include, for example, paging one or more individuals, forwarding the incoming telephone communication to a "land line" or mobile device, a pre-recorded auto response to incoming telephone communication, and a nested tree for a formation of a telephone tree. The auto response to the incoming telephone communication may be substantially static information, such as, for example, directions to the professional service provider's office, office hours, etc.

Thus, for example, an office of one or professional service providers may provide one or more buttons on a keypad with one or more professional service providers associated with the office. Each one or more buttons on the keypad are programmed with notification preferences of the one or more professional service providers.

As such, the button "1" may be set as a static message providing basic information about the office. The button "2" may forward the incoming call to a professional service provider who prefers that an incoming call be directed to his mobile telephone. Button "3" may forward calls to a second professional service provider who prefers that an incoming call be directed to an office land line. The button "4" may be for a third professional service provider who prefers to be notified of new voicemail messages by way of an SMS notification to a mobile device. The button "5" may notify an "on call" professional service provider whenever a message has been left.

Each assignment of a button may be permanent, temporary, or there may be a predetermined period of time in which the professional service provider opts to have the incoming call directed in another desired way. For example, a professional service provider may opt to have all incoming telephone calls between 8:00 AM and 6:00 PM be directed to his mobile telephone. Any incoming calls outside of these hours may be sent to voicemail and an email notice is sent to the professional service provider identifying that there is a voicemail message.

If a professional service provider does not respond to a notification from the telephone system within a predetermined period of time, the telephone system may attempt to notify the professional service provider again, contact a second predetermined professional service provider, or both. For example, if a pregnant individual calls her doctor at 8:00 PM complaining of experiencing contractions and leaves a message on the telephone system, if the doctor does not call her back by, for example, 8:30, the telephone system will again send a message to the doctor, call or contact a second doctor from the telephone system, or both.

Once the buttons of the keypad are assigned, an incoming telephone call is directed based on the assignment of the at least one functional module 20. The individual placing the incoming telephone call may be prompted by recorded messages as to which buttons 34 on the keypad 36 of the telephone 38 to press for each assigned professional service provider.

If a message is left by an individual, the telephone system may contact the professional service provider via pager, telephone, or other instant messaging system to identify that message is waiting. Once notified, the professional service provider then contacts the telephone system by telephone or Internet to listen to the awaiting message from the individual. By following voice prompts, the professional service provider may choose to initiate a live call back to the individual, record a note about the message, or prompt the telephone system to connect the professional service provider with the individual.

When a live call is initiated, either by the telephone system contacting the professional service provider or the professional service provider choosing to initiate the call in response to a recorded message, the telephone system preferably records the conversation. The telephone system then digitizes the audio and saves the audio file. After the conversation, the professional service provider has the option of recording a personal note about the conversation. This note would be saved and associated with the appropriate conversation audio file.

The professional service provider has access to the saved audio files via an Internet interface or directly into one or more computers into which the audio file is saved. The audio files may be saved for later use, the audio files can be downloaded for use by the professional service provider, the audio file can be sent for transcription, or a combination thereof. Additionally, the telephone system can detect the length of the audio file to enable the professional service provider to automatically bill the individual for the call where appropriate.

Incoming telephone calls directed in particular paths may be tagged as billable. For example, a medical practice may wish to bill for medication refills called in after regular business hours. Such billable incoming telephone calls may be automatically sent to an associated accounting department for invoicing and/or to a particular file associate with the individual. Further, the individual making the incoming telephone call may be told via the telephone system that the incoming telephone call is billable.

In exemplary embodiments, the telephone system may collect, store, and later recall a telephone number associated with an incoming telephone call. Data associated with the telephone number, such as, for example, individual associated with the telephone number, address of individual associated with the telephone number, past calls of individual associated with the telephone number, etc. may be accessible to the professional service provider when receiving the incoming telephone call from the individual or returning the call to the individual.

In the exemplary embodiment in which the telephone number of the incoming telephone call is recognized by the telephone system, the incoming telephone call is directed to the professional service provider based on the respective professional service provider's notification settings. If the professional service provider does not wish to be notified directly of the incoming telephone call, the telephony system may record a message from the individual. Such recorded message may saved and digitized and the professional service provider may be notified by a messaging system including, but not limited to, a paging system, mobile text message system, instant message, or telephone call.

When the professional service provider receives a message from the messaging system notifying of a new message, the professional service provider may place a telephone call to the telephone system to process the message. The telephone system may recognize the professional service provider by Caller ID, unique identification number entry, or another identification method. The telephone system preferably uses recorded voice prompts to guide the professional service provider through the optional commands which are entered through a touchtone phone keypad.

The professional service provider reviews the respective message. The professional service provider has options including, but not limited to, saving the message, initiating a live call with the individual, or recording a personal note about the message. If the professional service provider chooses to initiate a live call with the individual, the telephone system uses the individual's phone number, either captured by Caller ID or direct entry, to place the call to the individual and a live call is initiated.

The telephone system of exemplary embodiments allows the professional service provider to direct the telephone number to which he would prefer to be contacted at any particular time via the telephone system. Thus, an incoming telephone call is received by the telephone system, thereby initiating the aforementioned process. Upon receiving the incoming telephone call, the telephone call may be recorded and digitized by the telephone system to create and save an audio file of the associated incoming telephone call. After the call with the individual has ended, the telephone system may use voice prompts for command functions and allow the professional service provider reviewing the audio file the option to record a personal note about the incoming telephone call. The professional service provider can also choose audio file processing options including, but not limited to, saving the file for future review or use, sending the audio file for transcription, or tagging the audio file for download via an Internet-based or Internet accessible graphical interface, or a combination thereof.

The graphical interface allows the professional service provider to manage his respective account settings such as, for example, contact information and preferred notification method. Such graphical interface may also be used for data management such as, for example, accessing and reviewing audio files, saving the audio files, sending the audio files for transcription, tagging the audio file for download, other data manipulation and synchronization functions as may be made available, or a combination thereof.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention.

What is claimed is:

1. A method for handling incoming telephone communications to a professional service provider, the method comprising:

associating one or more telephone numbers of a telephone system with the a computer software;

assigning at least one functional module to one or more buttons of a telephone keypad via a graphical user interface (GUI), wherein the one or more buttons of the telephone keypad are associated with identical buttons on a telephone keypad of a telephone of an individual calling into the telephone system, wherein a telephone number associated with an incoming telephone communication is not the one or more telephone numbers associated with the telephone system;

receiving a telephone call from an individual to the professional service provider;

routing the telephone call from the professional service provider to the telephone system;

determining the functional module assignment based on the associated telephone number used:

directing, responsive to the individual making a selection by pressing one of the one or more buttons on the telephone keypad of the telephone of the individual, the incoming telephone communication based on the assignment of the at least one functional module; and tagging, responsive to the selection and based on the assignment of the at least one functional module, the incoming telephone communication as billable to a invoicing account for the individual.

2. The method according to claim 1, wherein the computer software is Internet-based, Internet-accessible, or a combination thereof.

3. The method according to claim 1, wherein the at least one functional module is selected from the group consisting of notifying one or more individuals via a telephone call, a page, an email, or an instant message, forwarding the incoming telephone communication, an auto response to the incoming telephone communication, and a nested tree for a formation of a telephone tree.

4. The method according to claim 3, wherein the auto response to the incoming telephone communication is substantially static information.

5. The method according to claim 1, wherein an individual creating or manipulating the graphical interface may customize the means of receiving the incoming telephone communication.

6. The method according to claim 5, wherein the means of receiving the incoming telephone communication is selected from the group consisting of a telephone call, an email, a page, a voicemail, an instant message, a message alert, and a combination thereof.

7. The method according to claim 6, wherein the means of receiving the incoming telephone communication depends upon one or more dates and times.

8. The method according to claim 1, further comprising:
assigning the at least one functional modules as a billable incoming telephone communication.

9. The method according to claim 8, further comprising:
forwarding data associated with the billable incoming telephone communication to enable invoicing of the individual calling into the telephone system.

10. The method according to claim 1, wherein one or more of the at least one functional modules may be assigned as automatically contacting a second individual if a first individual does not acknowledge receipt of a directed incoming telephone communication within a predetermined period of time.

11. The method according to claim 1, further comprising:
recording a message from the individual; saving the message;

and notifying a professional service provider of the message based on the preferences of the professional service provider.

12. A system comprising:
at least one professional service provider configured to:
receive a telephone call from an individual and route the telephone call to a telephone system;
the telephone system including computer software configured to:
associate one or more telephone numbers of the telephone system with the a computer software;
assign at least one functional module to one or more buttons of a telephone keypad via a graphical user interface (GUI), wherein the one or more buttons of the telephone keypad are associated with identical buttons on a telephone keypad of a telephone of an individual calling into the telephone system, wherein a telephone number associated with an incoming telephone communication is not the one or more telephone numbers associated with the telephone system;
determine the functional module assignment based on the associated telephone number used;
direct, responsive to the individual making a selection by pressing one of the one or more buttons on the telephone keypad of the telephone of the individual, the incoming telephone communication based on the assignment of the at least one functional module; and
tag, responsive to the selection and based on the assignment of the at least one functional module, the incoming telephone communication as billable to a invoicing account for the individual.

13. The system of claim 12 wherein the computer software is Internet-based, Internet-accessible, or a combination thereof.

14. The method according to claim 11, further comprising: placing a call to the individual response to the professional service provider choosing to initiate a live call with the individual.

15. The system according to claim 12, further comprising: a messaging system configured to: record a message from the individual; save the message; and notify a professional service provider of the message based on the preferences of the professional service provider.

16. The system of claim 14, wherein the messaging system is selected from the group comprising a paging system, a mobile text message system, an instant message, and a telephone call.

17. The system of claim 15, wherein the computer software is further configured to:
record the call placed to the individual responsive to the professional service provider choosing to initiate the live call; and
save the recorded call as an audio file.

18. The system of claim 14, wherein the computer software is further configured to:
detect a length of the audio file effective to enable the professional service provider to bill the individual for the call.

19. The system of claim 12, wherein the computer software is further configured to:
assign the functional module as a billable incoming telephone communication; and
enable an accounting department to invoice the individual for the incoming telephone communication.

20. The system of claim 14, wherein the computer software is further configured to:
enable the professional service provider to manage contact information and indicate the preferences of the professional service provider for notification.

21. The system of claim 14, wherein the preferences of the professional service provider for notification depend on a time at which the incoming telephone communication is received by the telephone system.

22. The system of claim 12, wherein the computer software is further configured to:
make call data securely available to the professional service provider via an application programming interface.

23. The system of claim 22, wherein the call data comprises a telephone number associated with the incoming telephone communication, an individual associated with a telephone number associated with the incoming telephone communication, an address associated with a telephone number associated with the incoming telephone communication, past calls received from a telephone number associated with the incoming telephone communication, or a combination thereof.

24. The system of claim 12, wherein the functional module is configured to notify an on call professional service provider.

* * * * *